March 11, 1969     T. H. RADGENS     3,431,783
CHROMATOGRAPH TAPE SEPTUM INJECTION PORT
Filed March 13, 1967
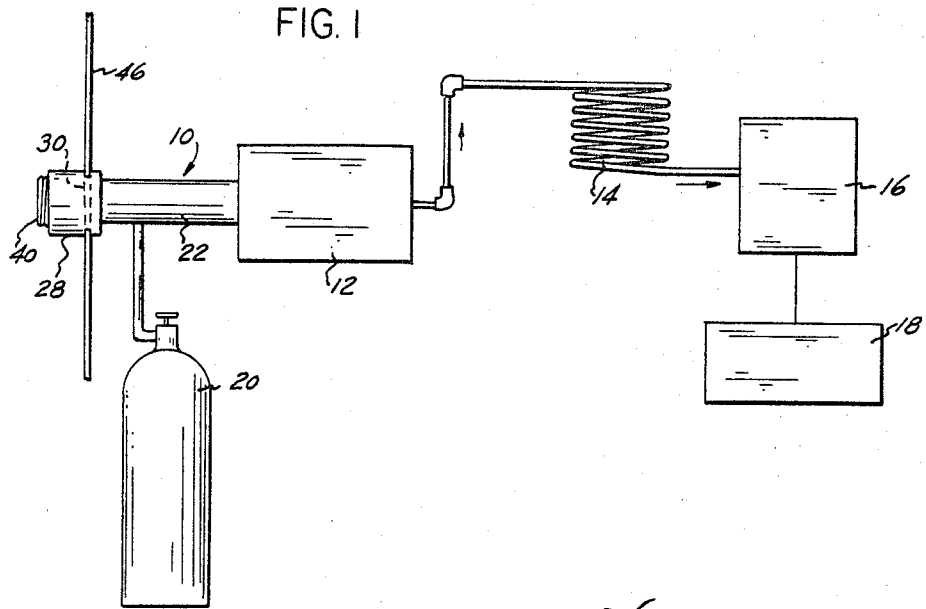
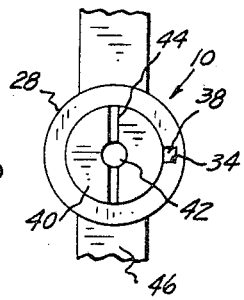
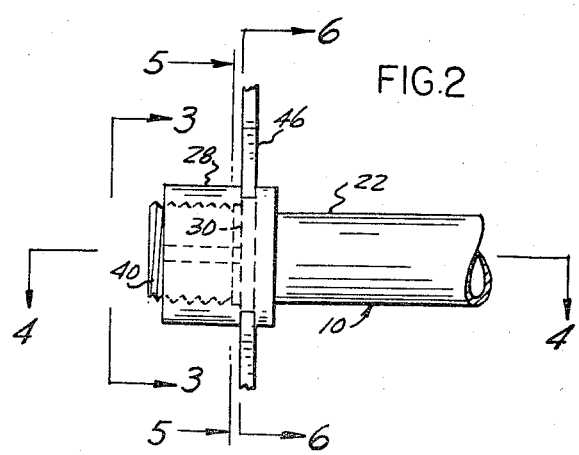
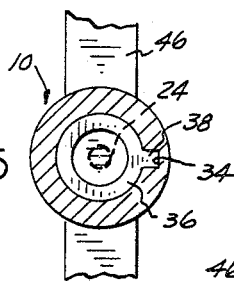
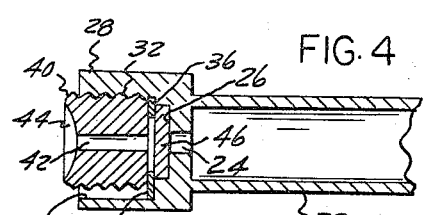
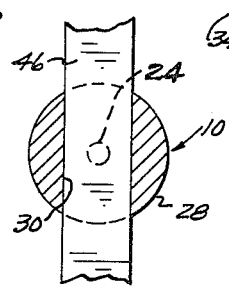
INVENTOR
THOMAS H. RADGENS
BY *Joseph G. Martin*
ATTORNEY United States Patent Office 3,431,783
Patented Mar. 11, 1969

3,431,783
CHROMATOGRAPH TAPE SEPTUM
INJECTION PORT
Thomas H. Radgens, 7340 Bingham,
Dearborn, Mich. 48126
Filed Mar. 13, 1967, Ser. No. 622,694
U.S. Cl. 73—422
Int. Cl. G01n 1/00
4 Claims

ABSTRACT OF THE DISCLOSURE

An injection port for chromatographs having a tubular stem with a continuous resilient septum tape slidably passing transversely therethrough. A plug yieldably holds the tape so as to seal the tubular stem, the plug being easily manipulated to release the tape so that it may be readily shifted in the tubular stem to re-seal the port after successive injections have rendered the tape pervious to the passage of liquid and gas.

Background of the invention

This invention relates to gas chromatography generally, as a method for separating and analyzing gas and volatile materials, and more particularly to a tape septum injection port for gas chromatographs. Chromatographs presently in use employ disc septums through which the sample of gas to be analyzed is injected. Because of the high injection port temperatures these disc septums usually leak after only a few injections, and must be regularly changed. This operation, while not complex, is tedious and time consuming because of the care which must be exercised in handling the hot injection port components.

Summary of the invention

This invention comprises an injection port for a chromatograph having a tubular stem with a transverse slot therethrough carrying a continuous septum tape. An axial plug is threaded into the hollow stem, and seats against a locking washer which bears on the septum tape. The plug may be retracted to release the septum tape so that it may be readily shifted in the stem.

In this way an unpierced section of the septum tape may be placed across the stem opening, and the plug advanced so as again to seal the injection port. The applicant's invention makes it possible to re-seal the injection port without handling or removing any of the components as is required when a disc type asembly is involved.

Brief description of the drawing

FIGURE 1 is a diagram showing the essential components in a chromatographic system.

FIGURE 2 is an enlarged elevation view of the applicant's injection port 10 detached from the system.

FIGURE 3 is an end view taken substantially on plane 3—3 in FIGURE 2, showing the slot 44 and the axial opening 42 in the threaded plug 40.

FIGURE 4 is a section view taken substantially on plane 4—4 in FIGURE 2, showing internal construction of the stem.

FIGURE 5 is a section view taken substantially on plane 5—5 in FIGURE 2, showing the longitudinal slot 34 in the stem 22, and the bearing washer 36 anchored therein.

FIGURE 6 is a section view taken substantially on plane 6—6 in FIGURE 2 showing the axial opening 24 and transverse slot 30 in the stem 22.

Description of the preferred embodiment

Referring to the drawing, numeral 10 designates an injection port connected into a conventional chromatographic system containing standard components consisting of a flash heater 12, a separating column 14, a detector 16, a recorder 18, and a source of carrier gas 20. The injection port 10 comprises a tubular stem 22 having therein a reduced axial opening 24 providing therearound an internal seating shoulder 26.

An enlarged end 28 on the tubular stem 22 has a transverse slot 30 therethrough aligned with the internal seating shoulder 26. An internally threaded section 32 in the enlarged end 28 is provided with a longitudinal slot 34. A bearing washer 36 in the enlarged end 28 of the tubular stem 22 has thereon a projection 38 engaged in the longitudinal slot 34.

A plug 40, having an axial opening 42 therethrough and a diametral slot 44 in the outer end, is engaged in the threaded section 32 in the enlarged end 28 on the tubular stem 22. A continuous resilient septum tape 46 is slidably engaged in the transverse slot 30 in the tubular stem 22, and yieldably held in sealing engagement with the internal seating shoulder 26 by the bearing washer 36.

Method of operation

In use, the sample to be analyzed is introduced into the chromatograph by means of a hypodermic syringe which injects the sample through the septum tape 46 in the injection port 10. The sample is instantly vaporized by the flash heater 12, and swept into the separating column 14 by the carrier gas from the supply tank 20.

Here the sample is separated into its components which are analyzed and made to produce signals that are transmitted to the recorder where a graph of the analysis is printed. After several samples have been injected through the septum tape 46, the plug 40 is retracted slightly so as to loosen the bearing washer 36. The septum tape 46 is then shifted so as to present an unpierced section over the opening 24 in the stem 22 of the injection port 10.

The plug 40 is returned to an advanced position so as to force the bearing washer 36 into contact with the septum tape 46 thereby pressing it into a sealing engagement with the seating shoulder 26. The injection port 10 is thus ready to receive further samples following which the septum tape 46 may again be shifted in the manner previously described so as to re-seal the port.

Based upon the foregoing discussion, the applicant is of the opinion that his invention has fulfilled a long-felt need in the field of chromatography, and that he has made a valuable contribution to the related art; however, while the invention was described with reference to the structural details of a single embodiment, the principles involved are susceptible of numerous other practical adaptations.

Therefore, I claim as new and desire to secure by Letters Patent:

1. An injection port for a chromatograph comprising a stem having therethrough a longitudinal opening and a transverse slot in communication with each other, a tape slidably engaged in the transverse slot, and means on the stem for pressing a portion of the tape against said longitudinal opening so as to seal the longitudinal opening.

2. The injection port of claim 1 in which the means for pressing a portion of the tape against said longitudinal opening comprises a plug adjustably engaged in the stem and adapted to apply bearing pressure on the tape, such plug having an opening therethrough providing access to the tape.

3. The injection port of claim 2 having in addition thereto a bearing washer between the tape and the plug.

4. The injection port of claim 3 in which the bearing washer has means thereon for orienting it in the stem and rendering it non-rotatable about its geometrical center.

References Cited

UNITED STATES PATENTS

| 3,000,218 | 9/1961 | Marks et al. | 73—422 |
|---|---|---|---|
| 3,247,704 | 4/1966 | Konig | 73—23.1 |

LOUIS R. PRINCE, *Primary Examiner.*

H. C. POST III, *Assistant Examiner.*

U.S. Cl. X.R.

73—23.1